Figure 1:
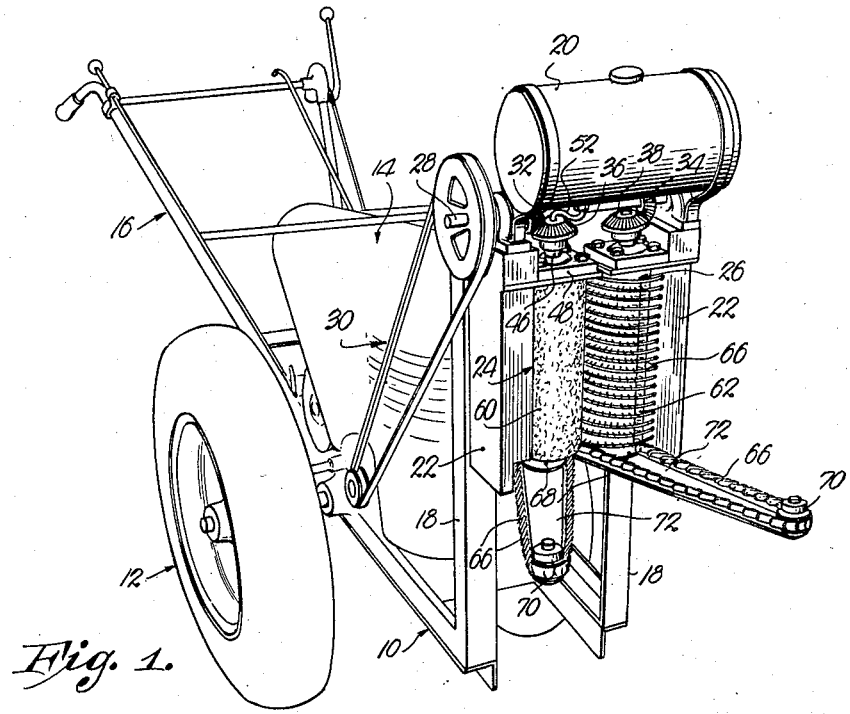
Figure 3:
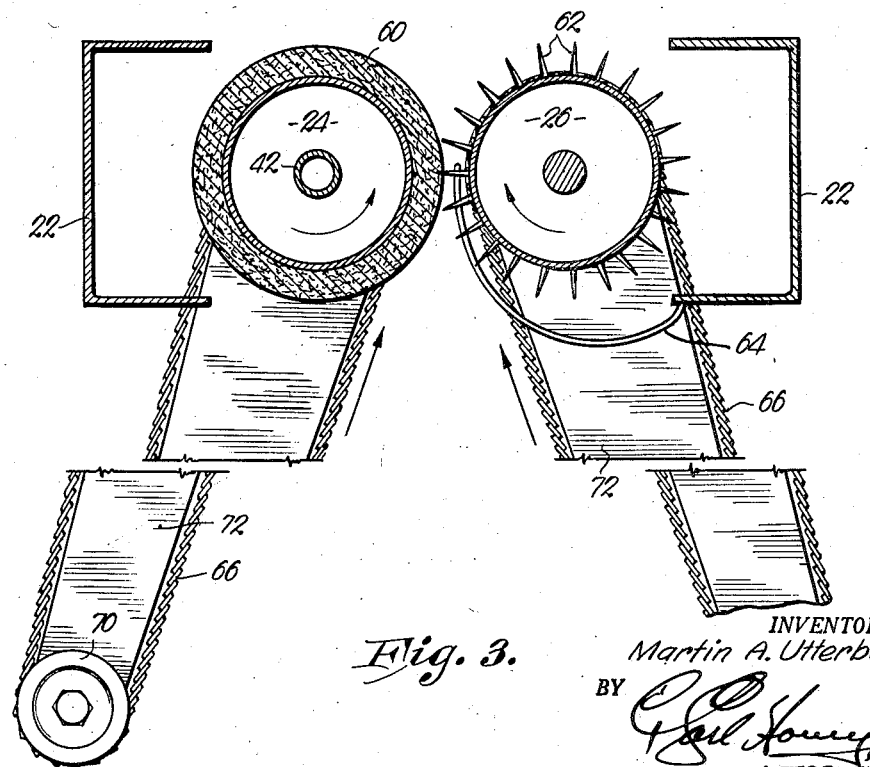

March 18, 1958  M. A. UTTERBACK  2,826,866
GRAIN INOCULATING MACHINE FOR ERGOT PRODUCTION
Filed Dec. 5, 1955  2 Sheets-Sheet 1

INVENTOR.
Martin A. Utterback
BY
ATTOR

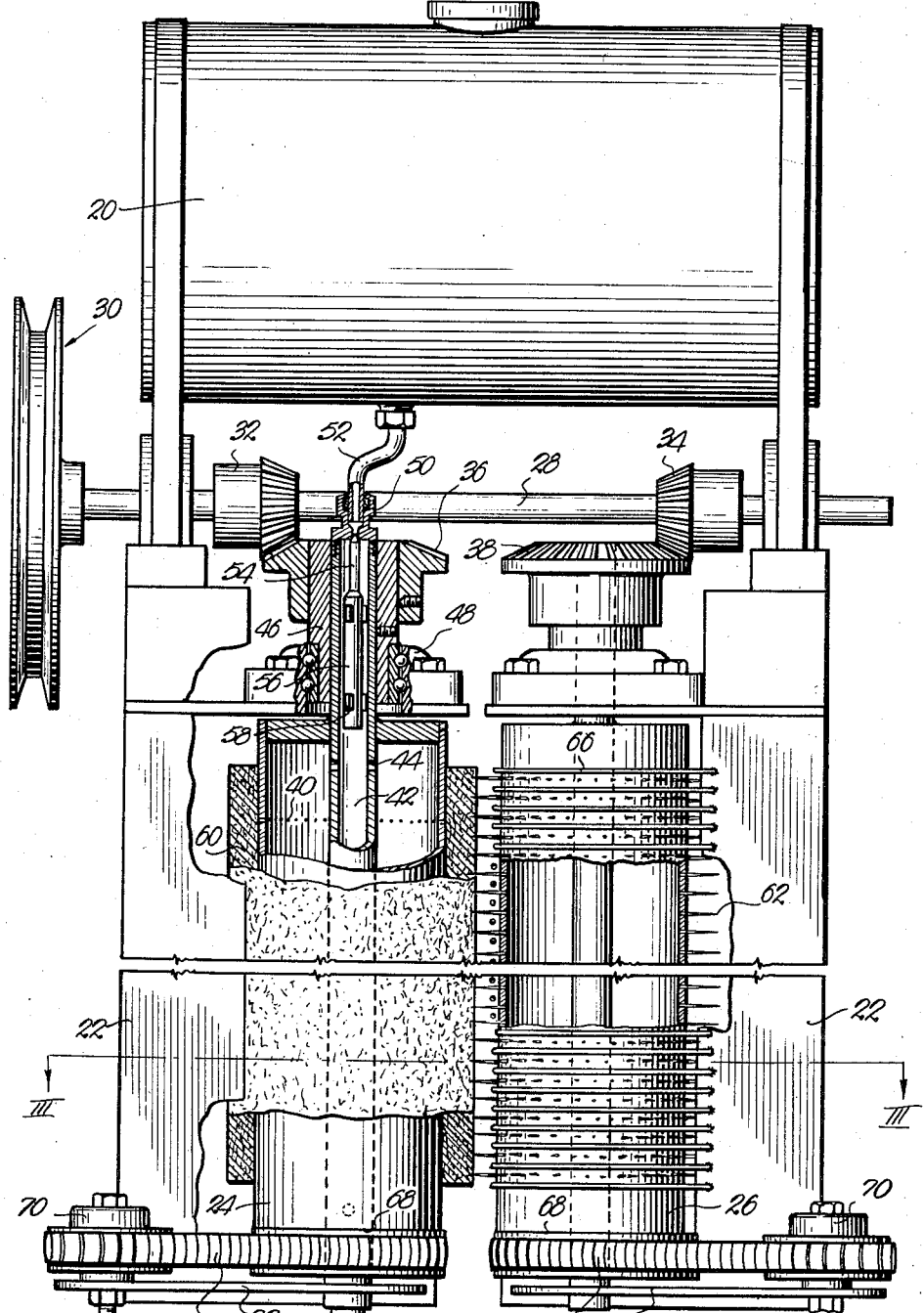

United States Patent Office 2,826,866
Patented Mar. 18, 1958

2,826,866

GRAIN INOCULATING MACHINE FOR ERGOT PRODUCTION

Martin A. Utterback, Parkville, Mo., assignor to William W. Buchanan, Lake Forest, Ill.

Application December 5, 1955, Serial No. 551,003

9 Claims. (Cl. 47—57.5)

This invention relates to the treatment of grain and more particularly to the production of ergot, the primary object being to provide a simple, inexpensive and easily operated machine for rapid inoculation of the premature heads of the growing plant with ergot spores.

It is the most important object of the present invention to provide a machine of the aforementioned character that includes piercing structure as a part thereof for puncturing the head of the growing cereal or the like whereby to allow the infectious solution to enter the plant and thereby adequately and positively infect the same with the aforementioned fungous disease.

Another important object of the instant invention is the provision of an inoculation machine operable in a manner to cause the infectious solution to be injected thereinto by virtue of the provision of piercing elements that not only puncture the heads to be infected, but pierce an absorptive pad that is maintained in a saturated condition with the inoculating solution.

A further object of the instant invention is to provide a portable machine for inoculating purposes that includes a pair of oppositely rotating rollers, one of which has the solution receiving covering mounted thereon and the other roller being provided with a plurality of outwardly-extending piercing elements that pass through the heads of the plants and into the saturated pad or covering as the heads pass between the rollers during advancement of the vehicle through the field.

A further object of the instant invention relates to the way in which there is provided novel structure for maintaining the absorptive pad or covering in a saturated condition through employment of a perforated drum about which the pad is wrapped, together with means including a storage tank coupled with the drum or hollow roller for maintaining the latter supplied with the solution.

A still further object of the instant invention has to do with the provision of a control valve adapted to maintain the drum supplied with the solution, yet avoid loss thereof by feeding the same to the pad at a rate faster than the same is used.

Additional objects include the way in which gathering means for the plants is provided to guide the heads between the rollers; the way in which means is provided to strip the heads from the piercing elements after inoculation; and the way in which all of the component parts of the machine are mounted on an easily manipulated, simple mobile vehicle to provide a lightweight, inexpensive, compact unit.

In the drawing:

Figure 1 is a front perspective view of a grain inoculating machine made pursuant to the present invention.

Fig. 2 is an enlarged, fragmentary, front elevational view, parts being broken away and in section to reveal details of construction.

Fig. 3 is a fragmentary, cross-sectional view taken on line III—III of Fig. 2 looking in the direction of the arrows.

As aforementioned, the machine about to be described is particularly adapted for facilitating quantity production of ergot and to this end, it is contemplated that through use of the machine premature heads of rye and other growing plants, particularly cereals that are especially susceptible to the fungous disease, be infected with a solution containing ergot spores. As will hereinafter appear, the result is accomplished by puncturing the heads against an absorptive pad that is maintained in a soaked condition with the infectious solution.

Referring now more particularly to the drawings, it is seen in Fig. 1 thereof, that the component parts of the machine are desirably mounted on a mobile vehicle having a frame broadly designated by the numeral 10 and supported by a single wheel and axle assembly 12, in turn driven by a suitable prime mover 14 carried by the frame 10. For purposes of simplicity it is seen that the vehicle is much in the nature of an ordinary garden tractor and that the same is provided with handle bars 16, permitting the machine to be manually guided through the field of growing plants.

In accordance with the principles of the instant invention, frame 10 includes a pair of uprights 18 upon the uppermost ends whereof is mounted a supply tank 20 for the aforementioned solution to be injected into the heads of the growing crop.

The uprights 18 in turn support a pair of vertical channels 22 disposed in facing relationship as seen best in Fig. 3, and between which is rotatably mounted a pair of rollers 24 and 26 that are spaced-apart for reception of the plant heads therebetween. Through the medium of suitable bearings carried by the channels 22, the rollers 24 and 26 are mounted for rotation on their vertical axes and to the end that the same may be driven in opposite directions from the prime mover 14, as seen by the arcuate arrows in Fig. 3 of the drawings, there is provided a horizontal driven shaft 28 rotatably carried by the channels 22 at the uppermost ends of the latter. The shaft 28 is operably coupled with the prime mover 14 by belt and pulley means 30 and is provided with bevel gears 32 and 34 for rollers 24 and 26 respectively, the latter of which are in turn provided with bevel gears 36 and 38 in mesh with gears 32 and 34 respectively.

The roller 24 is in the nature of a hollow drum having a circumferential row of perforations 40 near the uppermost end thereof as seen in Fig. 2 of the drawings. Hollow roller 24 is in turn mounted on a tubular shaft 42 provided with outlet ports 44 within the roller 24 and spaced above the perforations 40.

A tubular bushing 46 attached to the shaft 42 at the uppermost end of the latter in telescoping relationship thereto, receives uppermost bearing 48 for the roller 24 and, as seen in Fig. 2 of the drawings, the bevel gear 36 is mounted directly on the bushing 46.

A coupling 50 at the uppermost end of the shaft 42 in the nature of a rotary seal, connects the shaft 42 with the supply tank 20 through a conduit 52. The coupling 50 cooperates with a needle valve 54 within the shaft 42 and mounted on the uppermost end of a float 56, the latter of which is in turn centrally guided within the shaft 42 by a plurality of lateral ears 58 mounted directly thereon.

The roller 24 is wrapped with a relatively soft absorptive pad or covering 60 made from felt or the like and mounted on the roller 24 for rotation therewith in covering relationship to the perforations 40.

The roller 26 on the other hand, is provided with a plurality of outwardly-extending piercing elements 62 that are preferably in the nature of relatively sharp needles extending radially outwardly from the roller 26 and adapted to pierce the pad 60 as the mating surfaces of the rollers 24 and 26 move in the same direction as indicated in Fig. 3.

In the embodiment chosen for illustration, the needles 62 are arranged in spaced, horizontal rows circumscribing the roller 26 and between such rows there is provided a plurality of arcuate bars or wires 64 mounted on the proximal channel 22 and extending to a point between rollers 24 and 26 for stripping the heads from the needles 62 after the same have been infested with the solution contained in the pad 60.

A pair of relatively converging, continuous belts 66 or the like, extend forwardly from the rollers 24 and 26 at the lowermost ends of the latter for gathering the plant as the vehicle is advanced through the field and guiding the heads thereof between the rollers 24 and 26. Belts 66 are trained around sheave means 68 at the lowermost ends of the rollers 24 and 26 and around pulleys 70 carried by plates 72 at the outermost ends of the latter.

As the vehicle is motivated through use of prime mover 14 to advance the same through the field, guided by an operator grasping the handle bars 16, the said engine or other prime mover 14 simultaneously drives the driven shaft 28 which in turn imparts rotative motion to the two rollers 24 and 26. The plants are gathered together by the belts 66 and the heads thereof are directed between the rollers 24 and 26, at which time the heads are punctured by the piercing elements 62. Simultaneously, and by virture of the resilient and pliable nature of the pad 60, the solution contained therein is squeezed therefrom and applied to the head prior to its being stripped from the elements 62 by the wires or bars 64. By virtue of the fact that the heads are each pierced with a plurality of holes, the solution that is picked up thereby from the pad 60, is allowed to enter the heads and the latter therefore, become thoroughly and fully impregnated with such ergot spores.

It is seen that the pad 60 is constantly maintained in a soaked condition with the liquid substance by virtue of the fact that the hollow roller 24 is kept filled with the solution which passes from the shaft 42 into the roller 24 through the ports 44, and thence into the pad 60 by way of perforations 40.

The flow of solution from the tank 20 through the conduit 52 and coupling 50 into the shaft 42 is controlled by the needle valve 54. Manifestly, as the level of liquid within the shaft 42 rises, the float 56 will in turn close the needle valve 54 with respect to its seat within the coupling 50 and the flow of solution will cease until such time as the pad 60 absorbs additional material as a consequence of the same being squeezed therefrom during passage of the plant heads between the rollers 24 and 26.

Having thus described the invention what is claimed as new and desired to be secured by Letters Patent is:

1. In a machine for applying a substance to a plant, a pair of rollers spaced apart to receive the plant therebetween; a covering on one of the rollers adapted to contain the substance to be applied; and means on the other roller for piercing the covering and thereby the plant to allow the substance to enter the plant.

2. In a machine for applying a solution to a plant, a pair of rollers spaced apart to receive the plant therebetween; an absorptive covering on one of the rollers adapted to receive the solution to be applied; structure for directing the solution into the covering; and means on the other roller for piercing the covering and thereby the plant to allow the solution to enter the plant.

3. In a machine for applying a substance to a plant, a pair of rollers spaced apart to receive the plant therebetween; a covering on one of the rollers adapted to contain the substance to be applied; means on the other roller for piercing the covering and thereby the plant to allow the substance to enter the plant; and means for stripping the plant from said piercing means after the substance has been applied thereto.

4. In a machine for applying a substance to a plant, a pair of rollers spaced apart to receive the plant therebetween; means for rotating the rollers in opposite direction; a covering mounted on one of the rollers for rotation therewith and adapted to contain the substance to be applied; and means mounted on the other roller and rotatable therewith for piercing the covering and therefore the plant as the rollers rotate and receive the plant therebetween to allow the substance to enter the plant.

5. In a machine for injecting a solution into a plant, a pair of rollers spaced apart to receive the plant therebetween; means for rotating the rollers in opposite directions; an absorptive covering mounted on one of the rollers for rotation therewith; structure for maintaining the covering saturated with said solution; and a plurality of outwardly-extending piercing elements mounted on the other roller for piercing the covering as the rollers are rotated whereby said plant is punctured as it passes between the rollers to allow the solution to enter the same.

6. In an inoculating machine for ergotizing grain by injecting the premature heads of growing cereal plants with an infectious solution containing ergot spores, a vehicle having a pair of rollers spaced apart to receive the plant heads therebetween as the vehicle is advanced through the field; means for rotating the rollers in opposite directions; an absorptive pad mounted on one of the rollers for rotation therewith; structure for maintaining the pad soaked with said solution; and a plurality of outwardly-extending piercing elements mounted on the other roller for piercing the pad as the rollers are rotated whereby said heads are punctured as they pass between the rollers to allow the solution to enter the same.

7. In an inoculating machine for ergotizing grain by infecting the premature heads of growing cereal plants with a solution containing ergot spores, a vehicle having a pair of rollers mounted thereon for rotation on vertical axes; means for rotating the rollers in opposite directions, said rollers being spaced apart for receiving said heads therebetween as the vehicle is advanced through the field, one of the rollers comprising a perforated drum adapted to contain the solution and having an absorptive pad covering the same to receive the solution therefrom; and structure for maintaining the drum supplied with said solution.

8. In an inoculating machine for ergotizing grain by infecting the premature heads of growing cereal plants with a solution containing ergot spores, a vehicle having a pair of rollers mounted thereon for rotation on vertical axes; means for rotating the rollers in opposite directions, said rollers being spaced apart for receiving said heads therebetween as the vehicle is advanced through the field, one of the rollers comprising a perforated drum adapted to contain the solution and having an absorptive pad covering the same to receive the solution therefrom; structure for maintaining the drum supplied with said solution; and plant gathering means extending forwardly from the rollers for guiding the heads between the rollers.

9. In an inoculating machine for ergotizing grain by infecting the premature heads of growing cereal plants with a solution containing ergot spores, a vehicle having a pair of rollers mounted thereon for rotation on vertical axes; means for rotating the rollers in opposite directions, said rollers being spaced apart for receiving said heads therebetween as the vehicle is advanced through the field, one of the rollers comprising a perforated drum adapted to contain the solution and having an absorptive pad covering the same to receive the solution therefrom; a solution storage tank mounted on the vehicle and coupled with said drum for maintaining the drum supplied with said solution; and valve means for controlling the flow of solution from the tank to the drum.

References Cited in the file of this patent

UNITED STATES PATENTS

| | | |
|---|---|---|
| 2,158,115 | Fullilove | May 16, 1939 |
| 2,171,160 | Meiners | Aug. 29, 1939 |
| 2,314,045 | Johnson | Mar. 16, 1943 |

FOREIGN PATENTS

| | | |
|---|---|---|
| 917,395 | Germany | Sept. 2, 1954 |